United States Patent
Kawano et al.

(10) Patent No.: US 8,666,312 B2
(45) Date of Patent: Mar. 4, 2014

(54) ELECTRIC-FIELD COMMUNICATION DEVICE

(75) Inventors: Ryusuke Kawano, Atsugi (JP); Katsuyuki Ochiai, Atsugi (JP); Mitsuru Shinagawa, Atsugi (JP); Yuichi Kado, Atsugi (JP); Takuji Harada, Yokohama (JP); Hideyuki Okamoto, Yokohama (JP); Ryoichi Matsumoto, Yokohama (JP)

(73) Assignees: Nippon Telegraph and Telephone Corporation (JP); NTT Electronics Corporation (JP)

( * ) Notice: Subject to any disclaimer, the term of this patent is extended or adjusted under 35 U.S.C. 154(b) by 628 days.

(21) Appl. No.: 12/531,927

(22) PCT Filed: Mar. 21, 2008

(86) PCT No.: PCT/JP2008/055327
§ 371 (c)(1),
(2), (4) Date: Sep. 18, 2009

(87) PCT Pub. No.: WO2008/114870
PCT Pub. Date: Sep. 25, 2008

(65) Prior Publication Data
US 2010/0105323 A1     Apr. 29, 2010

(30) Foreign Application Priority Data
Mar. 22, 2007   (JP) ................................. 2007-075602

(51) Int. Cl.
*H04B 5/00*     (2006.01)
(52) U.S. Cl.
USPC ........................................................ 455/41.1
(58) Field of Classification Search
None
See application file for complete search history.

(56) References Cited

U.S. PATENT DOCUMENTS

| | | | |
|---|---|---|---|
| 5,230,787 A | * | 7/1993 | Cherian et al. .................. 205/67 |
| 6,627,956 B2 | * | 9/2003 | Asano et al. .................. 257/358 |

(Continued)

FOREIGN PATENT DOCUMENTS

| | | |
|---|---|---|
| CN | 1694223 A | 11/2005 |
| JP | 2003-037566 A | 2/2003 |

(Continued)

OTHER PUBLICATIONS

English translation of Shinagawa et al. JP2005217962 A, Aug. 11, 2005 in pdf form.*

(Continued)

*Primary Examiner* — Yuwen Pan
*Assistant Examiner* — Ayodeji Ayotunde
(74) *Attorney, Agent, or Firm* — Kilpatrick Townsend & Stockton LLP

(57) ABSTRACT

A signal electrode (11A) and a ground electrode (11B) are disposed respectively on surfaces of a case (10). In this way, the signal electrode (11A) and the ground electrode (11B) do not come into contact with any electric component, such as a transmission circuit (21), disposed inside the case (10), and thus a reduction in an electric field (Ec) induced in an electric-field transmission medium can be prevented. In addition, a certain distance between the signal electrode (11A) and the ground electrode (11B) is kept, and thus a reduction in the electric field (Ec) induced in the electric-field transmission medium can be prevented. Furthermore, the contactability between the signal electrode (11A) and the electric-field transmission medium is improved, and thus the electric field (Ec) induced in the electric-field transmission medium can be increased.

19 Claims, 8 Drawing Sheets

(56) References Cited

U.S. PATENT DOCUMENTS

| | | | |
|---|---|---|---|
| 6,984,160 B2 * | 1/2006 | Ando et al. | 445/24 |
| 2001/0010945 A1 * | 8/2001 | Miyazaki | 438/107 |
| 2002/0135272 A1 * | 9/2002 | Toda | 310/334 |
| 2003/0228740 A1 * | 12/2003 | Nagai et al. | 438/484 |
| 2005/0129345 A1 * | 6/2005 | Schilling | 385/8 |
| 2005/0244166 A1 * | 11/2005 | Shinagawa et al. | 398/186 |
| 2005/0250308 A1 * | 11/2005 | Yamaguchi et al. | 438/618 |
| 2008/0002126 A1 * | 1/2008 | Lim et al. | 349/141 |

FOREIGN PATENT DOCUMENTS

| | | | | |
|---|---|---|---|---|
| JP | 2005-217962 A | | 8/2005 | |
| JP | 2005217962 A | * | 8/2005 | H04B 13/00 |
| JP | 2006-324775 A | | 11/2006 | |
| JP | 2006-324966 A | | 11/2006 | |
| JP | 2006324775 A | * | 11/2006 | H04B 5/02 |
| JP | 2006324966 A | * | 11/2006 | H04B 13/00 |

OTHER PUBLICATIONS

English translation of Kubono et al. JP2006324775 A, Nov. 30, 2006 in pdf form.*

English translation of Shinagawa et al. JP2006324966 A, Nov. 30, 2006 in pdf form.*

Office Action, Korean Patent Application No. 10-2009-7019429, mailed Jan. 11, 2011.

http://www.redtacton.com, Nippon Telegraph and Telephone Corporation, 2005.

International Preliminary Report on Patentability for PCT/JP/055327, mailed Oct. 1, 2009.

Office Action, Chinese Patent Application No. 200880009241.5, mailed May 15, 2012. (with translation of paragraph 8).

Office Action, Chinese Patent Application No. 200880009241.5, mailed Jun. 9, 2013 (with partial translation).

* cited by examiner

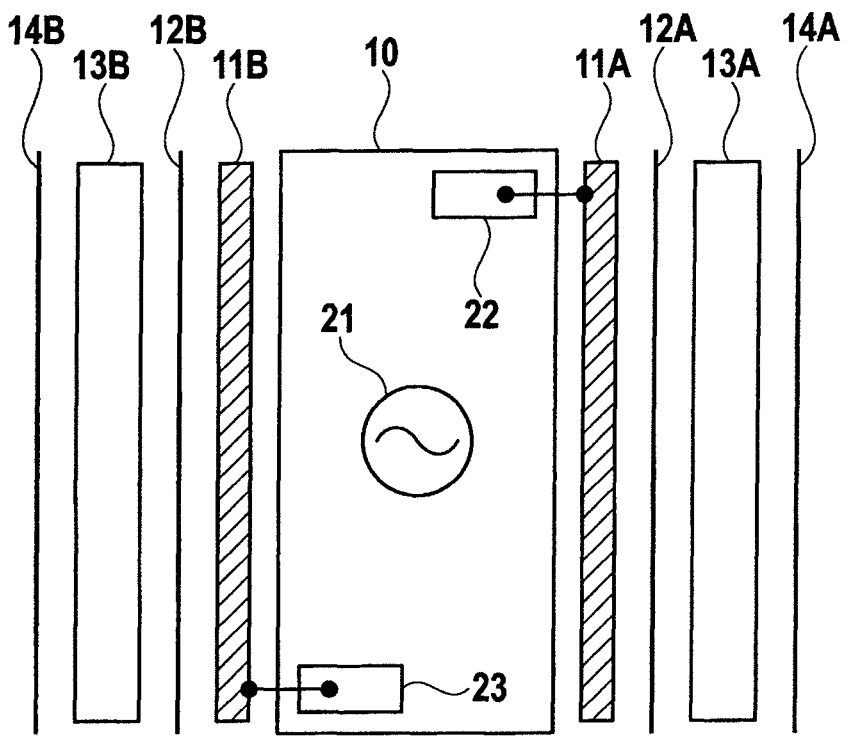
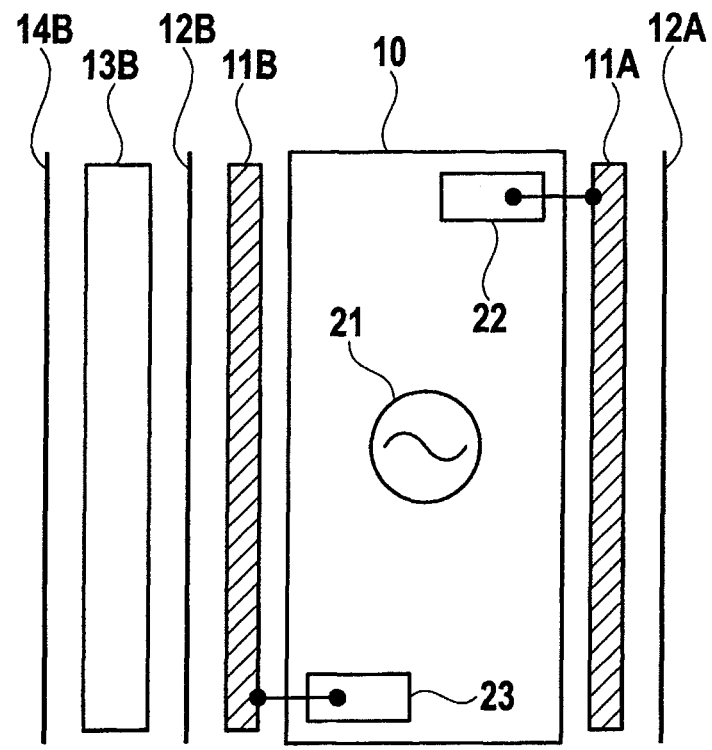

ELECTRIC-FIELD COMMUNICATION DEVICE

CROSS REFERENCE TO RELATED APPLICATIONS

This application is the U.S. National Phase of PCT/JP2008/055327 filed on Mar. 21, 2008 which claims the benefit Japanese Application No. JP2007-075602 filed on Mar. 22, 2007.

TECHNICAL FIELD

The present invention relates to an electric-field communication device which transmits data by inducing an electric field in an electric-field transmission medium.

BACKGROUND ART

There has been proposed a technique to induce an electric field in an electric-field transmission medium such as a human body, and use the electric-field thus induced to perform a data communication.

FIG. 13 is a schematic view for explaining a communication system which performs an electric-field communication using a human body as an electric-field transmission medium. The communication system shown in FIG. 13 is a communication system which performs a communication by utilizing an electric field induced in a user 401 between a transmitting device 201 and a receiving device 301.

When the transmitting device 201 transmits data to the receiving device 301, the transmitting device 201 induces an electric field Ec in the user 401 by a signal electrode 201A. The receiving device 301 receives data by detecting an electric field Ef induced in the user 401.

However, even though the electric field Ec is induced in the user 401, there still exist an electric field Eb directed back to a ground electrode 201B from the user 401, and an electric field Ee escaping to the ground. Thus, the electric field Ef reaching the receiving device 301 is the difference between the electric field Ec induced in the user 401 and the electric fields Eb and Ee. There also exists an electric field Ea directly inputted to the ground electrode 201B from the signal electrode 201A.

In addition, if the electric-field communication terminal is miniaturized and thus becomes easily portable, a stress is applied to a case of the electric-field communication terminal, causing a problem of a reduction in the electric field Ec induced in the user 401. This is because the stress: brings a mounted component into contact with the electrode arranged inside the case, so that the electric field Ec induced in the user 401 is cancelled; or reduces the distance between the signal electrode 201A and the ground electrode 201B, so that the electric field Ea is increased.

Moreover, when the user 401 touches the signal electrode 201A and the ground electrode 201B simultaneously, the electric field Eb directed back to the ground electrode 201B from the user 401 increases, which in turn reduces the electric field Ef to be detected by the receiving device 301. Consequently, a problem of deterioration in the communication quality occurs.

DISCLOSURE OF THE INVENTION

The present invention has been made in view of the above circumstances, and thus an object thereof is to improve the communication quality in an electric-field communication terminal.

An electric-field communication device according to a first invention is an electric-field communication device which induces, in an electric-field transmission medium, an electric field based on information to be transmitted, and which uses the electric field to transmit and receive the information. The electric-field communication device is characterized by including: a communication circuit; a case accommodating the communication circuit therein; a first electrode electrically connected to an input/output terminal of the communication circuit, and disposed on an outer surface of the case; and a second electrode electrically connected to a reference potential of the communication circuit, and disposed on an outer surface of the case while being insulated from the first electrode.

According to this invention, the first electrode and the second electrode are disposed respectively on the outer surfaces of the case accommodating the communication circuit therein. Thus, the electrodes do not come in contact with any electric component, such as the communication circuit even though a stress is applied to the case when the communication device is carried. A certain distance between the electrodes is kept as well. Accordingly, it is possible to prevent a reduction in the output of a transmitter, and a reduction in the amount of electric field to be detected as a received signal. Moreover, since the electrodes are provided on outer portions of the case, the contactability between the electrodes and the electric-field transmission medium is improved, thereby improving the communication quality.

An electric-field communication device according to a second invention is an electric-field communication device which induces, in an electric-field transmission medium, an electric field based on information to be transmitted, and which uses the electric field to transmit the information. The electric-field communication device is characterized by including: a transmission circuit; a case accommodating the transmission circuit therein; a first electrode electrically connected to an output terminal of the transmission circuit, and disposed on an outer surface of the case; and a second electrode electrically connected to a reference potential of the transmission circuit, and disposed on an outer surface of the case while being insulated from the first electrode.

An electric-field communication device according to a third invention is an electric-field communication device which receives information induced in an electric-field transmission medium. The electric-field communication device is characterized by including: a receiving circuit; a case accommodating the receiving circuit therein; a first electrode electrically connected to an input terminal of the receiving circuit, and disposed on an outer surface of the case; and a second electrode electrically connected to a reference potential of the receiving circuit, and disposed on an outer surface of the case while being insulated from the first electrode.

The above-described electric-field communication devices are characterized in that the first electrode and the second electrode are disposed to oppose each other, and the second electrode is not formed at a position corresponding to where the first electrode is disposed.

According to this invention, the second electrode disposed to oppose the first electrode is not formed at a position corresponding to where the first electrode is disposed. Thus, when the user holds the electric-field communication device, these two electrodes are less likely to be simultaneously touched by the user. Accordingly, it is possible to suppress deterioration in the communication quality.

The above-described electric-field communication devices are characterized in that a shape of the first electrode is different from a shape of the second electrode.

According to this invention, the first electrode and the second electrode have difference shapes. Thus, even when the user touches these two electrodes, there is a large difference between the electrodes in touch area, and thereby mutually-cancelling electric fields decrease. Accordingly, it is possible to suppress deterioration in the communication quality.

In the above-described electric-field communication devices, in order to make a large difference between the electrodes in touch area, it is preferable that any one of the first electrode and the second electrode have a plate-like shape whereas the other electrode have a line-like shape or strip-like shape.

The above-described electric-field communication devices are characterized in that the line-like or strip-like electrode is deformable, and does not physically come into contact with the other electrode.

According to this invention, by making the line-like electrode deformable, the electrode can be used as a strap of a keychain or the like.

In the above-described electric-field communication devices, in order to prevent the line-like or strip-like electrode from physically coming in contact with the other electrode, it is preferable that the line-like or strip-like electrode have such a length that the line-like or strip-like electrode does not come into contact with the other electrode.

The above-described electric-field communication devices are characterized in that at least one of the first electrode and the second electrode includes at least one metal layer provided on an outer side of the electrode and insulated from the electrode.

According to this invention, a metal layer, such as a metal plate, is further provided to an electrode. Thus, it is possible to improve the electric-field coupling with the electric-field transmission medium and to protect the electrodes.

The above-described electric-field communication devices are characterized in that an outermost layer of at least one of the first electrode and the second electrode is covered with an insulating film.

According to this invention, an electrode is covered with an insulating film. This not only prevents an electric current from flowing into the electric-field transmission medium, but also allows a user with a metal allergy to comfortably use the electric-field communication device.

The above-described electric-field communication devices are characterized in that each of the first electrode and the second electrode has a round corner.

According to this invention, corners of the electrodes are rounded, thereby reducing an electric field between the first and second electrodes. Accordingly, it is possible to improve the communication quality.

BRIEF DESCRIPTION OF THE DRAWINGS

FIG. 3 is a side view showing the structure of another transmitter according to the first embodiment.

FIG. 4 is a side view showing the structure of yet another transmitter according to the first embodiment.

BEST MODES FOR CARRYING OUT THE INVENTION

Embodiments of the present invention will be described below with reference to the drawings. It is to be noted that each of the embodiments will be described by focusing on a transmitter including a transmission circuit, but the embodiments can be similarly applied to a receiver including a receiving circuit and can also be similarly applied to a communication device including a transmission circuit and a receiving circuit.

First Embodiment

Figure 1:
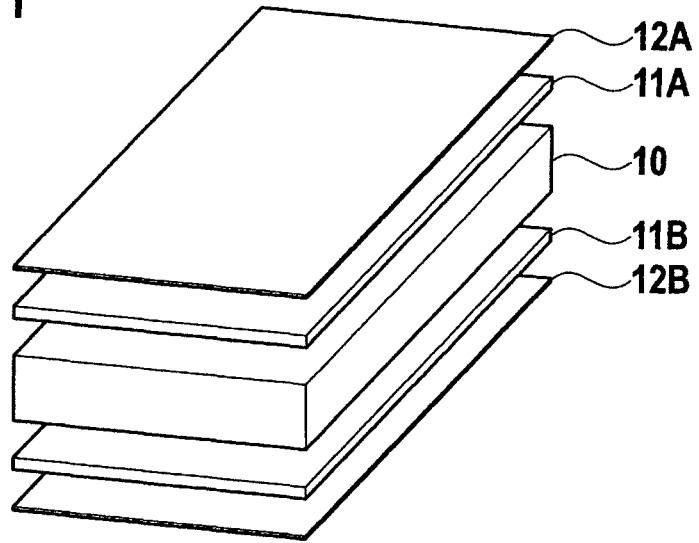
FIG. 1 is an exploded perspective view showing the structure of a transmitter according to a first embodiment.

FIG. 1 is an exploded perspective view showing the structure of a transmitter according to a first embodiment. The transmitter shown in FIG. 1 is an electric-field communication transmitter which transmits data by inducing an electric field in an electric-field transmission medium, such a human body. The electric field induced in the user by the transmitter reaches a receiver through the user, and is coupled to an electro-optic crystal provided to the receiver. This coupling changes the optical properties of the electro-optic crystal. By irradiating the electro-optic crystal with a laser beam and detecting the degree of the change, a data communication is performed. Here, the user can use the transmitter shown in FIG. 1 while it is held in his pocket or in a bag.

The transmitter shown in FIG. 1 has such a structure that: a signal electrode 11A and a ground electrode 11B are disposed respectively on an opposing pair of surfaces of a non-conductive case 10 accommodating a transmission circuit 21 and the like therein; and the signal electrode 11A and the ground electrode 11B are covered respectively with an insulating films 12A and 12B. As shown in FIG. 1, the case 10 is a rectangular solid shaped like a card case, and the signal electrode 11A and the ground electrode 11B are disposed respectively and entirely on the surfaces of the case 10 each of which has the largest area among all the surfaces of the case 10. A copper plate having a thickness of approximately 0.5 mm, for example, is used for each of the signal electrode 11A and the ground electrode 11B. In this way, by disposing the signal electrode 11A and the ground electrode 11B on the outer surfaces of the case 10, the contactability of the signal electrode 11A and the ground electrode 11B with the user can be improved.

Figure 2:
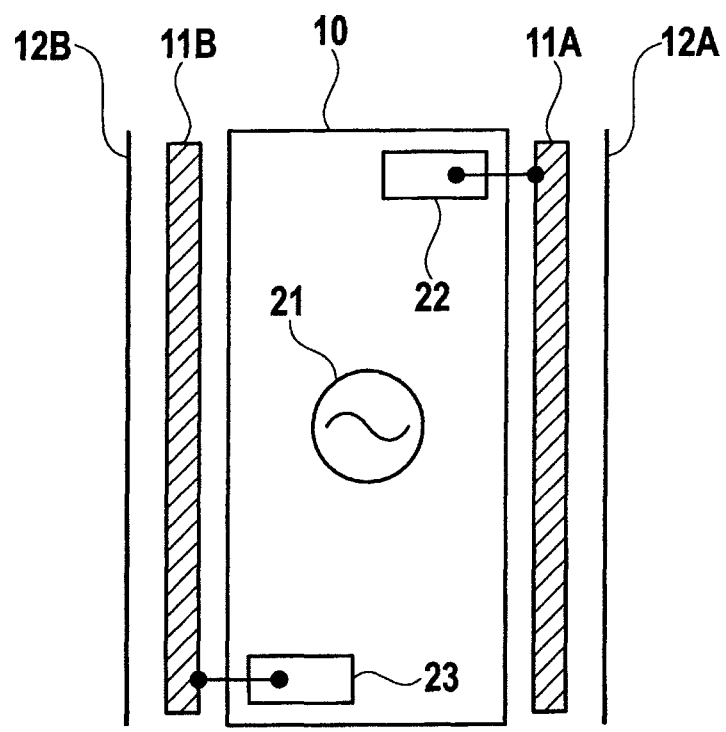
FIG. 2 is a side view showing the structure of the transmitter shown in FIG. 1.

FIG. 2 is a side view showing the structure of the transmitter shown in FIG. 1. As shown in FIG. 2, the transmission circuit 21 is contained within the case 10 of the transmitter, and the signal electrode 11A disposed on the surface of the case 10 is electrically connected to a signal output terminal 22 disposed inside the case 10. Meanwhile, the ground electrode 11B is electrically connected to a GND 23 of the transmission circuit 21. The signal electrode 11A and the ground electrode 11B are adhered respectively to the surfaces of the case 10 with double-faced tapes (not illustrated) or the like. In addition, the signal electrode 11A and the ground electrode 11B are covered respectively with the insulating films 12A and 12B so that an electric current would not flow into the human body.

In this way, since the signal electrode 11A inducing electric fields in the electric-field transmission medium and the ground electrode 11B are disposed on outer portions of the case 10, the signal electrode 11A and the ground electrode 11B do not come into contact with any electric component, such as the transmission circuit 21, disposed inside the case 10. Accordingly, a reduction in the electric field induced in the electric-field transmission medium can be prevented. Moreover, since the signal electrode 11A and the ground electrode 11B are disposed on the outer surfaces of the case 10, the contactability of the signal electrode 11A and the ground electrode 11B with the electric-field transmission medium is improved. Note that, also in the case where this embodiment is applied to a receiver having an input terminal of its receiving circuit being connected to the signal electrode 11A, a signal component received by the signal electrode 11A is prevented from passing to the ground electrode 11B. Thus, as in the case of the transmitter described above, the effect of improving the communication quality can be obtained.

FIG. 3 is a side view showing the structure of another transmitter according to the first embodiment. The transmitter shown in FIG. 3 is different from the transmitter shown in FIG. 2 in that metal plates 13A and 13B as well as insulating films 14A and 14B are provided. The other part of the structure of the transmitter shown in FIG. 3 is the same as that shown in FIG. 2, and the same components are denoted by the same reference numerals.

The metal plates 13A and 13B shown in FIG. 3 are disposed respectively on surfaces of the insulating films 12A and 12B covering the single electrode 11A and the ground electrode 11B, and are thus insulated from the signal electrode 11A and the ground electrode 11B. Moreover, the metal plates 13A and 13B are covered respectively with the insulating films 14A and 14B. As the signal electrode 11A and the ground electrode 11B are further covered with the metal plates 13A and 13B in this way, the electric-field coupling can be improved and, at the same time, the signal electrode 11A and the ground electrode 11B can be reinforced. Incidentally, metal-plated members may be used instead of the metal plates 13A and 13B. Further, the structure is not limited to the one in which both of the signal electrode 11A and the ground electrode 11B are provided respectively with the metal plates 13A and 13B. The structure may be such that only the metal plate 13B is disposed on one side as shown in FIG. 4, or that a larger number of layers are provided.

Figure 5:
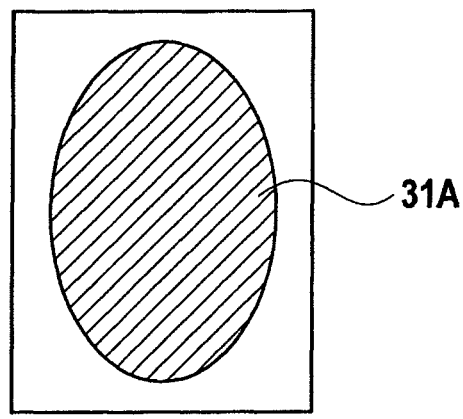
FIG. 5 is a plan view showing the appearance of an electrode provided to still another transmitter according to the first embodiment.

Moreover, each of the copper plates forming the signal electrode 11A and the ground electrode 11B may be formed in, for example, an elliptical shape as shown in FIG. 5 by rounding the corners thereof. In this way, the electric field Ea directed toward the corners of the ground electrode 11B from the corners of the signal electrode 11A can be reduced.

Thus, according to this embodiment, since the signal electrode 11A and the ground electrode 11B are disposed on the surfaces of the case 10, the signal electrode 11A and the ground electrode 11B do not come into contact with any electric component, such as the transmission circuit 21, disposed inside the case 10. Hence, a reduction in the electric field Ec induced in the electric-field transmission medium can be prevented. In addition, since a certain distance between the signal electrode 11A and the ground electrode 11B is kept, the electric field Ea directed toward the ground electrode 11B from the signal electrode 11A does not increase. Consequently, a reduction in the electric field Ec induced in the electric-field transmission medium can be prevented. Furthermore, since the contactability between the signal electrode 11A and the electric-field transmission medium is improved, the electric field Ec induced in the electric-field transmission medium can be increased.

According to this embodiment, by rounding the corners of each of the signal electrode 11A and the ground electrode 11B, the electric field Ea directed toward the ground electrode 11B from the signal electrode 11A can be reduced. Thus, the electric field Ec induced in the electric-field transmission medium can be increased.

According to this embodiment, the signal electrode 11A and the ground electrode 11B are covered with the insulating films 12A and 12B, respectively, and further with the metal plates 13A and 13B, respectively. Thus, the electric-field coupling can be improved and, at the same time, the signal electrode 11A and the ground electrode 11B can be reinforced.

Second Embodiment

Figure 6:
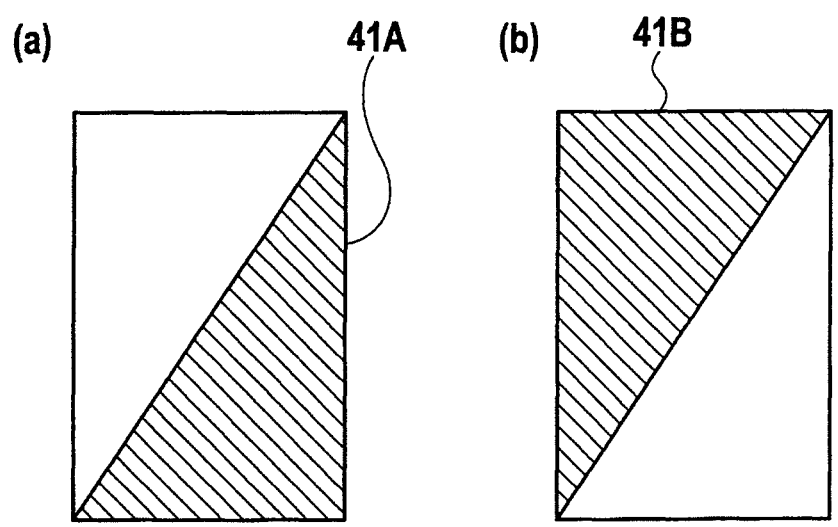
FIG. 6 is a plan view showing the appearances of electrodes provided to a transmitter according to a second embodiment.

FIG. 6 is a plan view showing electrodes of a transmitter according to a second embodiment. FIG. 6(a) is a plan view of a signal electrode 41A connected to the signal output terminal 22 inside the case 10. FIG. 6(b) is a plan view of a ground electrode 41B connected to the GND 23 inside the case 10. Unlike the signal electrode 11A and the ground electrode 11B shown in FIG. 1 in the first embodiment, which are disposed respectively and entirely on the opposing pair of surfaces of the case 10, the signal electrode 41A and the ground electrode 41B shown in FIG. 6 are disposed respectively but only partially on the opposing pair of surfaces of the case 10.

As shown in FIG. 6, a portion where the electrode is formed and a portion where no electrode is formed are oriented in a reversed manner between the signal electrode 41A and the ground electrode 41B. In this way, when the transmitter is held by the user by pinching the surfaces where the electrodes are disposed, the signal electrode 41A and the ground electrode 41B are less likely to be touched at the same time. Thus, it is possible to reduce the electric field Eb which cancels the electric field Ec induced in the user.

In addition, the structure is not limited to the one in which the portion where the electrode is formed and the portion where no electrode is formed are oriented in the reversed manner. Any structure can be employed as long as the ground electrode 41B disposed to oppose the signal electrode 41A is not present in a position corresponding to the signal electrode 41A.

Figure 7:
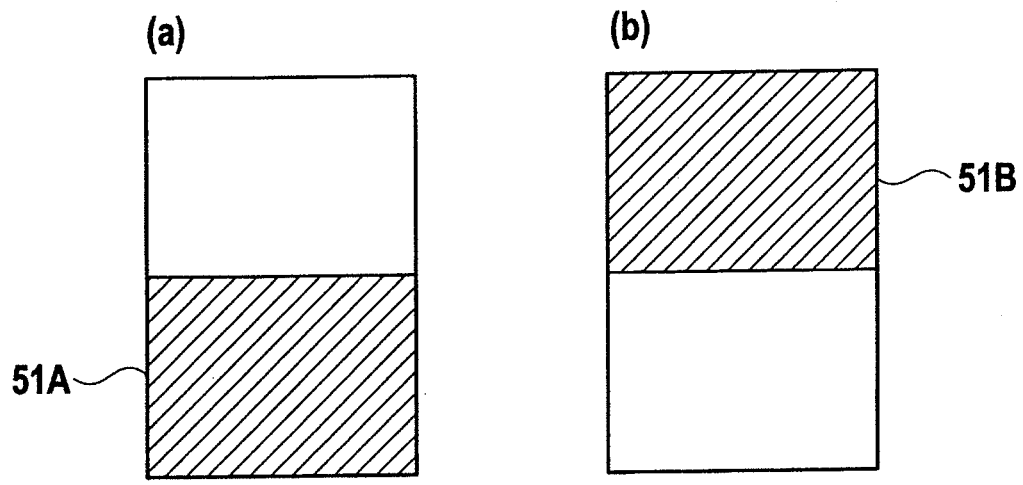
FIG. 7 is a plan view showing the appearances of electrodes provided to another transmitter according to the second embodiment.

In addition to what is shown in FIG. 6, the electrodes may be disposed in such a way that one electrode is disposed on the lower half of the corresponding surface of the case 10 while the other electrode is disposed on the upper half of the corresponding surface thereof, as shown in FIG. 7(a) and FIG. 7(b), for example. The shapes of the electrodes can, of course, be other shapes than those described above. Note that the electrodes shown in FIG. 6 and FIG. 7 should preferably be disposed on the surfaces of the case 10 as described in the first embodiment, but may be disposed inside the case 10 instead.

As described above, according to this embodiment, the signal electrode 41A and the ground electrode 41B are formed in the mutually reversed shapes, and thus the signal electrode 41A and the ground electrode 41B are less likely to be touched at the same time when the user pinches the transmitter by his fingers. Therefore, deterioration in the communication quality can be prevented.

Third Embodiment

Figure 8:
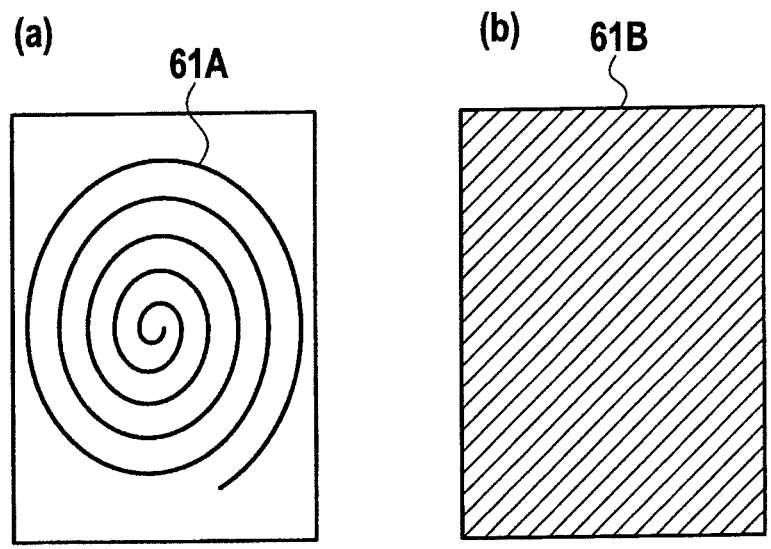
FIG. 8 is a plan view showing the appearances of electrodes provided to a transmitter according to a third embodiment.

FIG. 8 is a plan view showing the structures of electrodes of a transmitter according to a third embodiment. FIG. 8(a) shows the appearance of a signal electrode 61A, and FIG. 8(b) shows the appearance of a ground electrode 61B. The signal electrode 61A and the ground electrode 61B shown in FIG. 8 are disposed respectively on the surfaces of the case 10 of the transmitter shown in FIG. 1.

As shown in FIG. 8, the signal electrode 61A has a line-like shape whereas the ground electrode 61B has a rectangular shape, and thus the signal electrode 61A and the ground electrode 61B have mutually asymmetrical shapes. Such mutually asymmetrical shapes of the signal electrode 61A and the ground electrode 61B allow a large difference between the signal electrode 61A and the ground electrode 61B in terms of their areas which the user touches when touching the signal electrode 61A and the ground electrode 61B simultaneously. Accordingly, the electric field is cancelled less, and thereby a reduction in the electric field Ef reaching the receiver can be suppressed.

Figure 9:
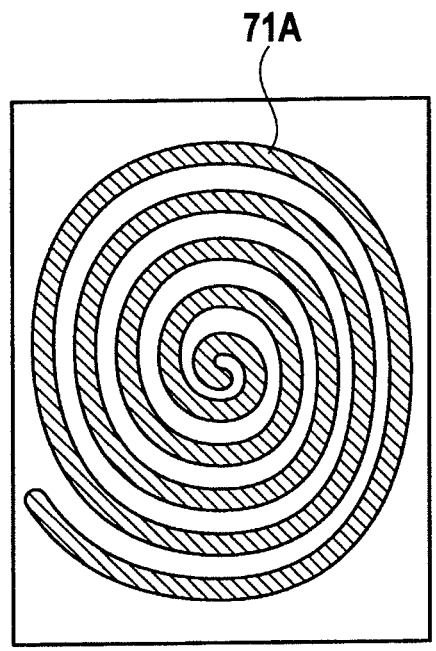
FIG. 9 is a plan view showing another example of the electrode shown in FIG. 8($a$).

Incidentally, the line-like signal electrode 61A shown in FIG. 8(a) may be formed of a tape-like electrode as shown in FIG. 9 instead. Moreover, the shape of the signal electrode 61A is not limited to the spiral shape as shown in FIG. 8(a), and may be a comb shape or the like, for example. Furthermore, FIGS. 8(a) and 8(b) may be switched so that the signal electrode 61A would have the rectangular shape whereas the ground electrode 61B would have the line-like shape or the strip-like shape.

Figure 10:
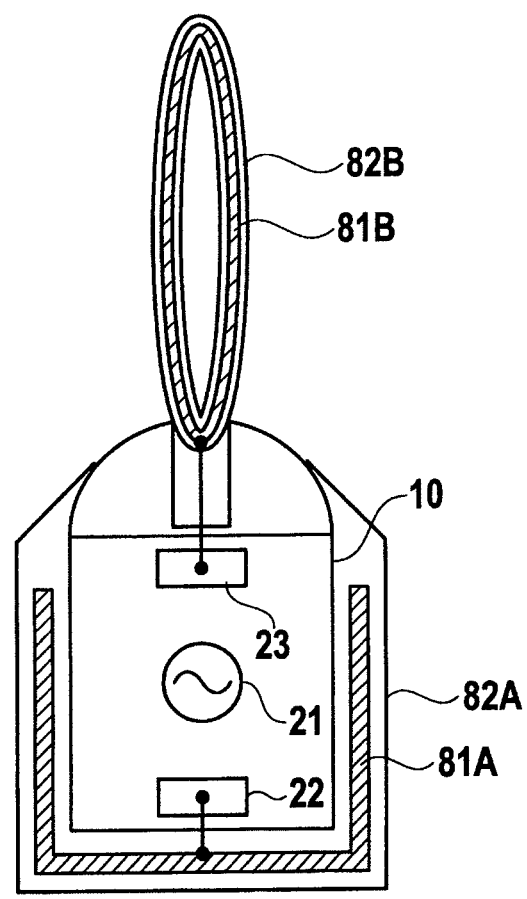
FIG. 10 is an explanatory view showing the structure of another transmitter according to the third embodiment.

FIG. 10 is an explanatory view showing the structure of another transmitter according to the third embodiment. Unlike the rectangular parallelepiped transmitter shown in each of FIGS. 1 to 7, the transmitter shown in FIG. 10 takes the form of a keychain. A signal electrode 81A is disposed on an outer surface of the case 10 of the keychain, and a line-like ground electrode 81B is disposed as a strap part of the keychain and is covered with an insulating film 82B. The circumference of the signal electrode 81A is covered with an insulating film 82A. The signal electrode 81A is electrically connected to the signal output terminal 22 of the transmission circuit 21, and the ground electrode 81B is electrically connected to the GND of the transmission circuit 21.

To avoid a short circuit due to a physical contact between the signal electrode 81A and the ground electrode 81B, the ground electrode 81B is shortened, or a lower portion of the ground electrode 81B is covered with a hard plastic pipe, for example. In this way, the ground electrode 81B would not come into contact with the signal electrode 81A even when the ground electrode 81B bends.

Figure 11:
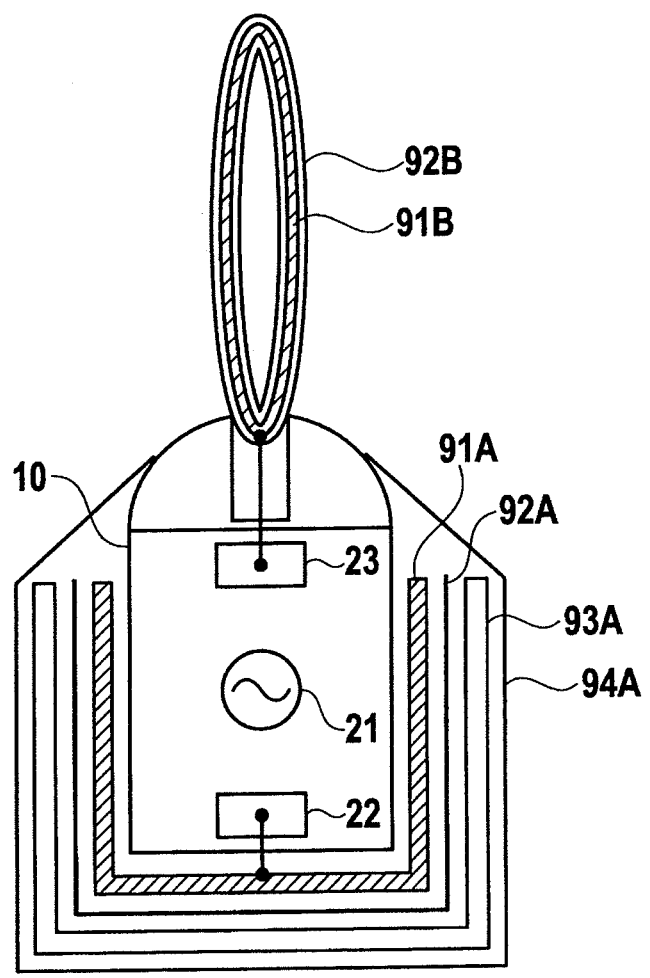
FIG. 11 is an explanatory view showing the structure of yet another transmitter according to the third embodiment.

FIG. 11 is an explanatory view showing the structure of yet another transmitter according to the third embodiment. In comparison with the transmitter shown in FIG. 10, the transmitter shown in FIG. 11 includes a metal plate 93A disposed on the circumference of a signal electrode 91A with an insulating film 92A interposed therebetween. Additionally, the outermost circumference of the signal electrode 91A is covered with an insulating film 94A.

Figure 12:
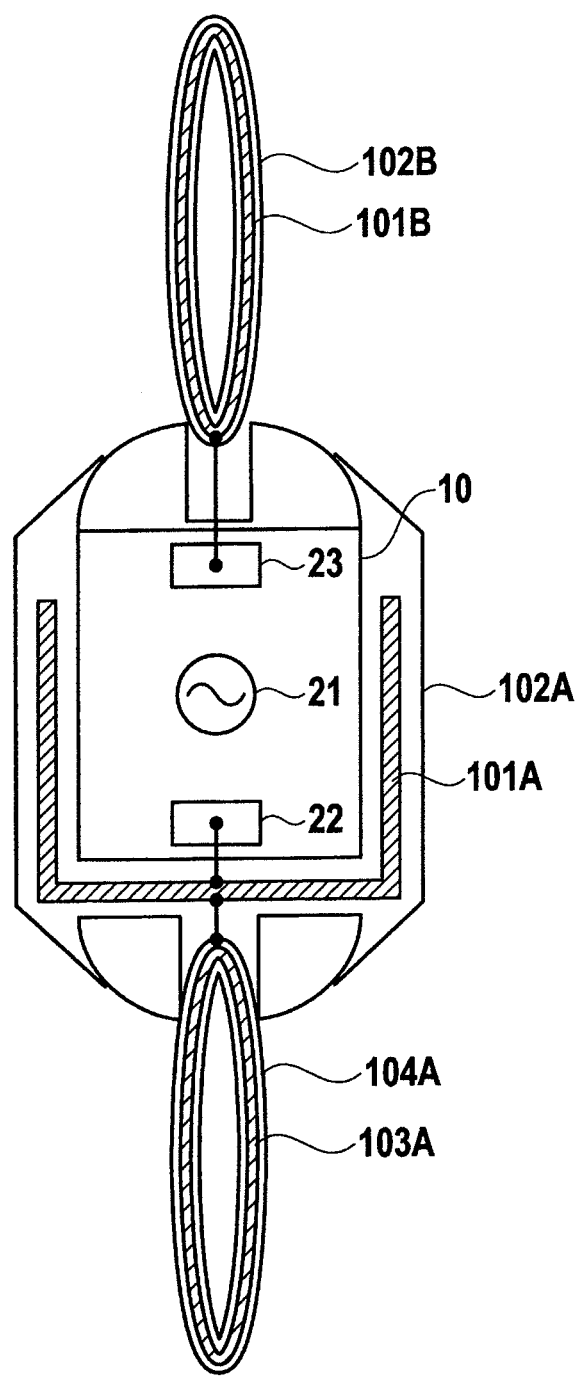
FIG. 12 is an explanatory view showing the structure of still another transmitter according to the third embodiment.
Figure 13:
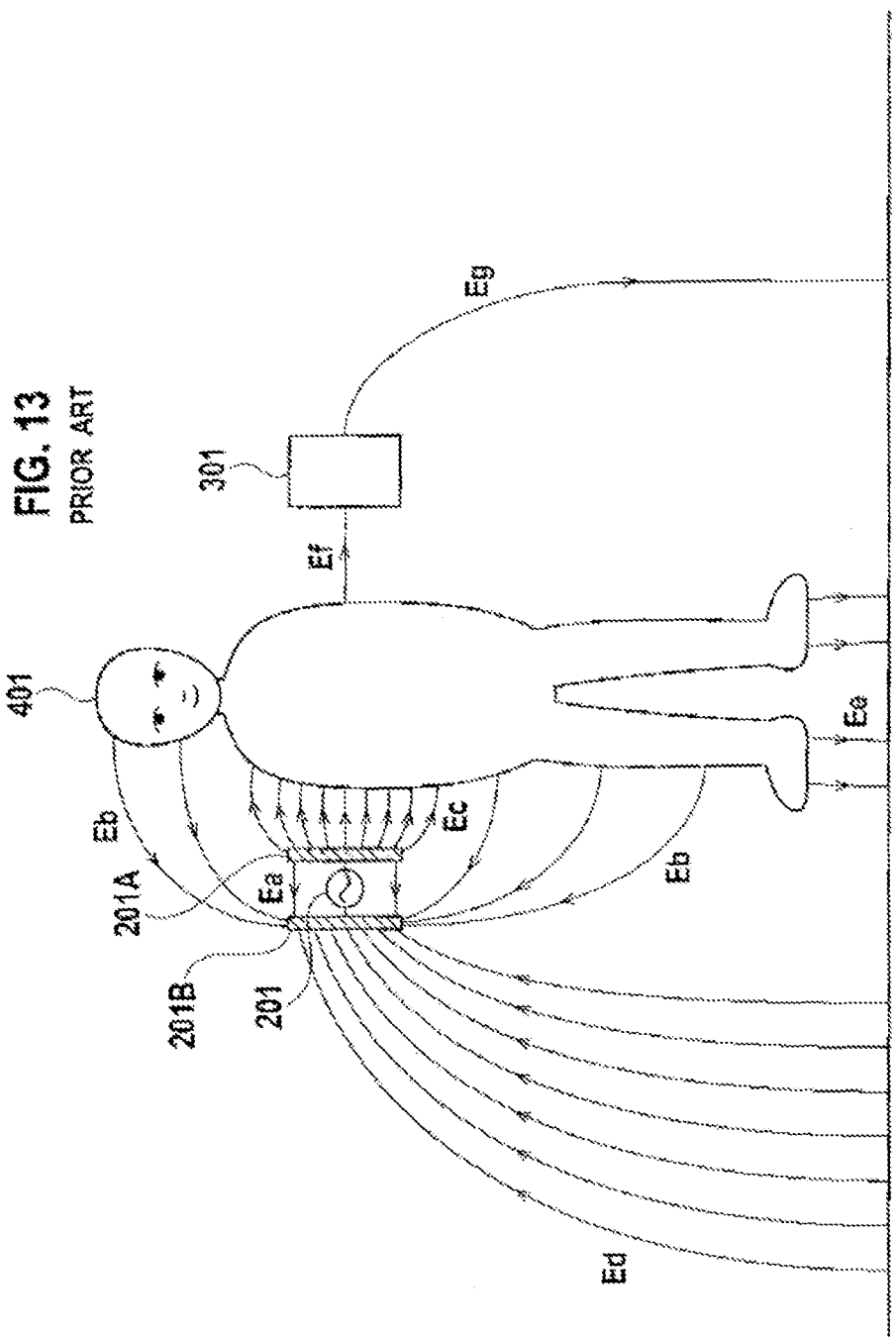
FIG. 13 is a schematic view showing an electric field model of an electric-field communication system.

FIG. 12 is an explanatory view showing the structure of still another transmitter according to the third embodiment. In comparison with the transmitter shown in FIG. 10, the transmitter shown in FIG. 12 further includes a line-like electrode 103A connected to a signal electrode 101A. The electrode 103A is covered with an insulating member 104A. Since no short circuit occurs even when the electrode 103A comes into contact with the signal electrode 101A, bending of the electrode 103A to some extent does not cause any adverse effect.

Thus, according to this embodiment, the different shapes of the signal electrode 61A and the ground electrode 61B allow a large difference between the signal electrode 61A and the ground electrode 61B in terms of their areas where the user touches when touching the signal electrode 61A and the ground electrode 61B simultaneously. Accordingly, the electric field is cancelled less, thereby suppressing a reduction in the electric field Ef reaching the receiver.

The invention claimed is:

1. An electric-field communication device which induces, in an electric-field transmission medium, an electric field based on information to be transmitted, and uses the electric field to transmit and receive the information, the electric-field communication device comprising:
    a communication circuit;
    a case accommodating the communication circuit therein;
    a first electrode electrically connected to an input/output terminal of the communication circuit, and disposed on an outer surface of the case;
    a second electrode electrically connected to a reference potential of the communication circuit, and disposed on an outer surface of the case while being insulated from the first electrode;
    at least one insulating film provided on an outer side of at least one of the first electrode and the second electrode; and
    at least one metal layer provided on the insulating film, wherein the insulating film insulates the metal layer from the at least one of the first electrode and the second electrode on which the insulating film is provided,
    wherein both the first electrode and the second electrode have plate-like shapes.

2. The electric-field communication device according to claim 1, characterized in that the first electrode and the second electrode are disposed to oppose each other, and the second electrode is not formed at a position corresponding to where the first electrode is disposed.

3. The electric-field communication device according to claim 1, characterized in that a shape of the first electrode is different from a shape of the second electrode.

4. An electric-field communication device which induces, in an electric-field transmission medium, an electric field based on information to be transmitted, and uses the electric field to transmit and receive the information, the electric-field communication device characterized by comprising:
    a communication circuit;
    a case accommodating the communication circuit therein;
    a first electrode electrically connected to an input/output terminal of the communication circuit, and disposed on an outer surface of the case;
    a second electrode electrically connected to a reference potential of the communication circuit, and disposed on an outer surface of the case while being insulated from the first electrode;
    at least one insulating film provided on an outer side of at least one of the first electrode and the second electrode; and
    at least one metal layer provided on the insulating film, wherein the insulating film insulates the metal layer from the at least one of the first electrode and the second electrode on which the insulating film is provided,
    wherein any one of the first electrode and the second electrode has a plate-like shape whereas the other electrode has a line-like shape or a strip-like shape.

5. The electric-field communication device according to claim 4, characterized in that the line-like or strip-like electrode is deformable, and does not physically come into contact with the other electrode.

6. The electric-field communication device according to claim 5, characterized in that the line-like or strip-like electrode has such a length that the line-like or strip-like electrode does not come into contact with the other electrode.

7. The electric-field communication device according to claim 1, characterized in that an outermost layer of at least one of the first electrode and the second electrode is covered with an insulating film.

8. The electric-field communication device according to claim 1, characterized in that each of the first electrode and the second electrode has a round corner.

9. An electric-field communication device which induces, in an electric-field transmission medium, an electric field based on information to be transmitted, and uses the electric field to transmit the information, the electric-field communication device characterized by comprising:
  a transmission circuit;
  a case accommodating the transmission circuit therein;
  a first electrode electrically connected to an output terminal of the transmission circuit, and disposed on an outer surface of the case;
  a second electrode electrically connected to a reference potential of the transmission circuit, and disposed on an outer surface of the case while being insulated from the first electrode;
  at least one insulating film provided on an outer side of at least one of the first electrode and the second electrode; and
  at least one metal layer provided on the insulating film, wherein the insulating film insulates the metal layer from the at least one of the first electrode and the second electrode on which the insulating film is provided,
  wherein both the first electrode and second electrode have plate-like shapes.

10. The electric-field communication device according to claim 9, characterized in that the first electrode and the second electrode are disposed to oppose each other, and the second electrode is not formed at a position corresponding to where the first electrode is disposed.

11. The electric-field communication device according to claim 9, characterized in that a shape of the first electrode is different from a shape of the second electrode.

12. The electric-field communication device according to claim 9, characterized in that an outermost layer of at least one of the first electrode and the second electrode is covered with an insulating film.

13. An electric-field communication device which receives information induced in an electric-field transmission medium, the electric-field communication device characterized by comprising:
  a receiving circuit;
  a case accommodating the receiving circuit therein;
  a first electrode electrically connected to an input terminal of the receiving circuit, and disposed on an outer surface of the case;
  a second electrode electrically connected to a reference potential of the receiving circuit, and disposed on an outer surface of the case while being insulated from the first electrode;
  at least one insulating film on an outer side of at least one of the first electrode and the second electrode; and
  at least one metal layer provided on the insulating film, wherein the insulating film insulates the metal layer from the at least one of the first electrode and the second electrode on which the insulating film is provided,
  wherein both the first electrode and the second electrode have plate-like shapes.

14. The electric-field communication device according to claim 13, characterized in that the first electrode and the second electrode are disposed to oppose each other, and the second electrode is not formed at a position corresponding to where the first electrode is disposed.

15. The electric-field communication device according to claim 13, characterized in that a shape of the first electrode is different from a shape of the second electrode.

16. The electric-field communication device according to claim 13, characterized in that an outermost layer of at least one of the first electrode and the second electrode is covered with an insulating film.

17. An electric-field communication device which induces, in an electric-field transmission medium, an electric field based on information to be transmitted, and uses the electric field to transmit and receive the information, the electric-field communication device characterized by comprising:
  a communication circuit;
  a case accommodating the communication circuit therein;
  a first electrode electrically connected to an input/output terminal of the communication circuit, and disposed on an outer surface of the case;
  a second electrode electrically connected to a reference potential of the communication circuit, and disposed on an outer surface of the case while being insulated from the first electrode;
  at least one insulating film provided on an outer side of at least one of the first electrode and the second electrode; and
  at least one metal layer provided on the insulating film, wherein the insulating film insulates the metal layer from the at least one of the first electrode and the second electrode on which the insulating film is provided,
  wherein any one of the first electrode and the second electrode has a plate-like shape whereas the other electrode has a line-like shape or strip-like shape, and
  wherein the metal layer is disposed on the insulating film provided on the plate-like shaped electrode, and the line-like or strip-like shaped electrode is covered with an insulating film, and the line-like or strip-like shaped electrode is capable of being deformed in various directions by fingers, and does not physically come into with the plate-like shaped electrode.

18. An electric-field communication device which induces, in an electric-field transmission medium, an electric field based on information to be transmitted, and uses the electric field to transmit the information, the electric-field communication device characterized by comprising:
  a transmission circuit;
  a case accommodating the transmission circuit therein;
  a first electrode electrically connected to an output terminal of the transmission circuit, and disposed on an outer surface of the case;
  a second electrode electrically connected to a reference potential of the transmission circuit, and disposed on an outer surface of the case while being insulated from the first electrode;
  at least one insulating film provided on an outer side of a least one of the first electrode and the second electrode; and
  at least one metal layer provided on the insulating film, wherein the insulating film insulates the metal layer from the at least one of the first electrode and the second electrode on which the insulating film is provided, wherein any one of the first electrode and the second electrode has a plate-like shape whereas the other electrode has a line-like shape or strip-like shape, and wherein the metal layer is disposed on the insulating film provided on the plate-like shaped electrode, and the line-like or strip-like shaped electrode is covered with an insulating film, and the line-like or strip-like shaped electrode is capable of being deformed in various directions by fingers, and does not physically come into with the plate-like shaped electrode.

19. An electric-field communication device which receives information induced in an electric-field transmission medium, the electric-field communication device characterized by comprising:

a receiving circuit;

a case accommodating the receiving circuit therein;

a first electrode electrically connected to an input terminal of the receiving circuit, and disposed on an outer surface of the case;

a second electrode electrically connected to a reference potential of the receiving circuit, and disposed on an outer surface of the case while being insulated from the first electrode;

at least one insulating film on an outer side of at least one of the first electrode and the second electrode; and at least one metal layer provided on the insulating film, wherein the insulating film insulates the metal layer from the at least one of the first electrode and the second electrode on which the insulting film is provided, wherein any one of the first electrode and the second electrode has a plate-like shape whereas the other electrode has a line-like shape or strip-like shape, and wherein the metal layer is disposed on the insulating film provided on the plate-like shaped electrode, and the line-like or strip-like shaped electrode is covered with an insulating film, and the line-like or strip-like shaped electrode is capable of being deformed in various directions by fingers, and does not physically come into with the plate-like shaped electrode.

* * * * *